United States Patent
Lee et al.

(10) Patent No.: US 8,514,711 B2
(45) Date of Patent: Aug. 20, 2013

(54) REVERSE LINK LOWER LAYER ASSISTED VIDEO ERROR CONTROL

(75) Inventors: Yen-Chi Lee, San Diego, CA (US); Christopher Gerard Lott, San Diego, CA (US); Peerapol Tinnakornsrisuphap, San Diego, CA (US); Vikram Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 872 days.

(21) Appl. No.: 11/454,475

(22) Filed: Jun. 15, 2006

(65) Prior Publication Data

US 2007/0091816 A1    Apr. 26, 2007

Related U.S. Application Data

(63) Continuation-in-part of application No. 11/315,399, filed on Dec. 21, 2005.

(60) Provisional application No. 60/729,017, filed on Oct. 21, 2005.

(51) Int. Cl.
*H04L 1/00* (2006.01)

(52) U.S. Cl.
USPC .......................................... 370/235; 370/252

(58) Field of Classification Search
None
See application file for complete search history.

(56) References Cited

U.S. PATENT DOCUMENTS

| 4,774,587 | A | * | 9/1988 | Schmitt ................. 358/426.09 |
| 5,341,374 | A | | 8/1994 | Lewen et al. |
| 5,367,523 | A | | 11/1994 | Chang et al. |
| 5,541,919 | A | | 7/1996 | Yong et al. |
| 5,550,589 | A | | 8/1996 | Shiojiri et al. |
| 5,550,593 | A | | 8/1996 | Nakabayashi |
| 5,621,840 | A | | 4/1997 | Kawamura et al. |
| 5,768,533 | A | | 6/1998 | Ran |
| 5,790,538 | A | | 8/1998 | Sugar |
| 5,802,068 | A | | 9/1998 | Kudo |
| 5,838,678 | A | | 11/1998 | Davis et al. |

(Continued)

FOREIGN PATENT DOCUMENTS

| CN | 1272271 | 11/2000 |
| CN | 1273011 | 11/2000 |

(Continued)

OTHER PUBLICATIONS

International Search Report—PCT/US06/060141—International Search Authority, European Patent Office—Mar. 21, 2007.

(Continued)

*Primary Examiner* — Kevin C Harper
*Assistant Examiner* — Rhonda Murphy
(74) *Attorney, Agent, or Firm* — Brent A. Boyd (57) ABSTRACT

The disclosure relates to reverse link lower layer assisted video error control. A method may encode video data, form a packet with the encoded video data, and transmit the packet across a wireless channel to an access network. A medium access control (MAC) layer may receive a negative acknowledgement (NAK) from the access network. The method may determine whether the received NAK is associated with a packet that contains video data. If the received NAK is associated with a packet that contains video data, the method may perform error control.

37 Claims, 4 Drawing Sheets
(1 of 4 Drawing Sheet(s) Filed in Color)

(56) References Cited

U.S. PATENT DOCUMENTS

| | | | |
|---|---|---|---|
| 5,969,764 A | 10/1999 | Sun et al. | |
| 6,002,802 A | 12/1999 | Chujoh et al. | |
| 6,111,917 A * | 8/2000 | Tomita et al. | 375/240.27 |
| 6,154,489 A | 11/2000 | Kleider et al. | |
| 6,233,251 B1 * | 5/2001 | Kurobe et al. | 370/471 |
| 6,330,683 B1 | 12/2001 | Jeddeloh | |
| 6,389,034 B1 | 5/2002 | Guo et al. | |
| 6,396,956 B1 | 5/2002 | Ribas-Corbera et al. | |
| 6,404,776 B1 | 6/2002 | Voois et al. | |
| 6,421,387 B1 * | 7/2002 | Rhee | 375/240.27 |
| 6,487,316 B1 * | 11/2002 | Fukunaga et al. | 382/239 |
| 6,490,243 B1 | 12/2002 | Tanaka et al. | |
| 6,574,247 B1 | 6/2003 | Baggen et al. | |
| 6,587,437 B1 | 7/2003 | Lee et al. | |
| 6,629,318 B1 * | 9/2003 | Radha et al. | 725/134 |
| 6,633,609 B1 | 10/2003 | Ing et al. | |
| 6,747,991 B1 | 6/2004 | Hemy et al. | |
| 6,862,298 B1 | 3/2005 | Smith et al. | |
| 6,865,374 B2 | 3/2005 | Kalluri | |
| 6,891,822 B1 | 5/2005 | Gubbi et al. | |
| 7,023,915 B2 | 4/2006 | Pian et al. | |
| 7,051,358 B2 * | 5/2006 | Hakenberg et al. | 725/114 |
| 7,058,085 B2 | 6/2006 | Earnshaw et al. | |
| 7,068,086 B2 | 6/2006 | Takeda | |
| 7,193,966 B2 | 3/2007 | Gupta et al. | |
| 7,197,026 B2 | 3/2007 | Chen et al. | |
| 7,206,285 B2 | 4/2007 | Loguinov | |
| 7,269,139 B1 | 9/2007 | Williams, Jr. et al. | |
| 7,304,951 B2 | 12/2007 | Rhee | |
| 7,342,880 B2 | 3/2008 | Yanagihara et al. | |
| 7,342,901 B1 | 3/2008 | Zhang et al. | |
| 7,356,079 B2 | 4/2008 | Laksono et al. | |
| 7,369,497 B2 | 5/2008 | Naruse | |
| 7,369,517 B2 | 5/2008 | Dillinger et al. | |
| 7,433,408 B2 | 10/2008 | Hatano et al. | |
| 7,453,938 B2 | 11/2008 | Haskell et al. | |
| 7,492,710 B2 | 2/2009 | Wadekar et al. | |
| 7,533,192 B2 * | 5/2009 | Otsuka et al. | 710/6 |
| 7,606,427 B2 | 10/2009 | Malayath et al. | |
| 8,102,878 B2 | 1/2012 | Lee | |
| 2002/0007416 A1 | 1/2002 | Putzolu | |
| 2002/0031336 A1 | 3/2002 | Okada et al. | |
| 2002/0054578 A1 | 5/2002 | Zhang et al. | |
| 2002/0154640 A1 | 10/2002 | Wei | |
| 2002/0191544 A1 | 12/2002 | Cheng et al. | |
| 2002/0191722 A1 | 12/2002 | Naruse | |
| 2003/0012212 A1 * | 1/2003 | Earnshaw et al. | 370/428 |
| 2003/0026277 A1 | 2/2003 | Pate et al. | |
| 2003/0054769 A1 | 3/2003 | Kalluri | |
| 2003/0095594 A1 | 5/2003 | Laksono et al. | |
| 2003/0152032 A1 | 8/2003 | Yanagihara et al. | |
| 2004/0076118 A1 | 4/2004 | Ho et al. | |
| 2004/0240558 A1 | 12/2004 | Hatano et al. | |
| 2004/0252761 A1 | 12/2004 | Brown et al. | |
| 2005/0013244 A1 | 1/2005 | Parlos | |
| 2005/0013245 A1 | 1/2005 | Sreemanthula et al. | |
| 2005/0117056 A1 | 6/2005 | Aprea et al. | |
| 2005/0152320 A1 | 7/2005 | Marinier et al. | |
| 2005/0175093 A1 | 8/2005 | Haskell et al. | |
| 2005/0207392 A1 | 9/2005 | Sivalingham et al. | |
| 2005/0210515 A1 | 9/2005 | Roh et al. | |
| 2005/0220116 A1 | 10/2005 | Ahn et al. | |
| 2005/0243846 A1 | 11/2005 | Mallila | |
| 2005/0249231 A1 * | 11/2005 | Khan | 370/428 |
| 2005/0259694 A1 | 11/2005 | Garudadri et al. | |
| 2005/0283809 A1 | 12/2005 | Kim | |
| 2006/0007958 A1 | 1/2006 | Kang et al. | |
| 2006/0013263 A1 | 1/2006 | Fellman | |
| 2006/0050743 A1 | 3/2006 | Black et al. | |
| 2006/0072832 A1 | 4/2006 | Nemiroff et al. | |
| 2006/0083243 A1 | 4/2006 | Igarashi et al. | |
| 2006/0256756 A1 | 11/2006 | Wakabayashi | |
| 2007/0019931 A1 | 1/2007 | Sirbu | |
| 2007/0071030 A1 | 3/2007 | Lee | |
| 2007/0091815 A1 | 4/2007 | Tinnakornsrisuphap et al. | |
| 2007/0097257 A1 | 5/2007 | El-Maleh et al. | |
| 2007/0121706 A1 | 5/2007 | Nakamura et al. | |
| 2007/0201406 A1 * | 8/2007 | Yoon et al. | 370/335 |
| 2007/0291870 A1 | 12/2007 | Ponnekanti | |
| 2008/0056125 A1 | 3/2008 | Kneckt et al. | |
| 2008/0170500 A1 | 7/2008 | Ito et al. | |
| 2008/0205856 A1 | 8/2008 | Kim et al. | |
| 2009/0021572 A1 | 1/2009 | Garudadri et al. | |
| 2009/0034610 A1 | 2/2009 | Lee et al. | |
| 2009/0046743 A1 | 2/2009 | Hamanaka | |
| 2009/0180379 A1 | 7/2009 | Leung et al. | |
| 2010/0215053 A1 | 8/2010 | Chakareski et al. | |

FOREIGN PATENT DOCUMENTS

| | | |
|---|---|---|
| CN | 1293871 | 5/2001 |
| CN | 1674676 A | 9/2005 |
| EP | 1014739 | 6/2000 |
| EP | 1168732 | 1/2002 |
| EP | 1170957 | 1/2002 |
| EP | 1261163 A2 | 11/2002 |
| EP | 1372304 | 12/2003 |
| EP | 1482681 A1 | 1/2004 |
| EP | 1478137 | 11/2004 |
| EP | 1575225 | 9/2005 |
| EP | 1628446 A1 | 2/2006 |
| EP | 1641147 | 3/2006 |
| JP | 9130787 | 5/1997 |
| JP | 9214507 A | 8/1997 |
| JP | 10164533 A | 6/1998 |
| JP | 10303932 A | 11/1998 |
| JP | 10322673 A | 12/1998 |
| JP | 10341217 A | 12/1998 |
| JP | 11069349 A | 3/1999 |
| JP | 2000324171 A | 11/2000 |
| JP | 2001230809 | 8/2001 |
| JP | 2001238256 A | 8/2001 |
| JP | 2001517049 A | 10/2001 |
| JP | 2002016929 A | 1/2002 |
| JP | 2002354141 A | 12/2002 |
| JP | 2003209537 A | 7/2003 |
| JP | 2003244695 | 8/2003 |
| JP | 2004015761 A | 1/2004 |
| JP | 2004072720 A | 3/2004 |
| JP | 2004208001 A | 7/2004 |
| JP | 2004253883 A | 9/2004 |
| JP | 2004350227 A | 12/2004 |
| JP | 2004364277 A | 12/2004 |
| JP | 2004537203 A | 12/2004 |
| JP | 2005057323 A | 3/2005 |
| JP | 2005192073 A | 7/2005 |
| JP | 2005236783 A | 9/2005 |
| JP | 2005286832 A | 10/2005 |
| JP | 2005303925 A | 10/2005 |
| JP | 2006222822 A | 8/2006 |
| KR | 20020081521 A | 10/2002 |
| KR | 1020060046281 | 5/2006 |
| RU | 2161873 C2 | 1/2001 |
| RU | 2219671 | 12/2003 |
| RU | 2219682 C2 | 12/2003 |
| RU | 2295833 C2 | 3/2007 |
| WO | WO9823109 A2 | 5/1998 |
| WO | WO9914975 | 3/1999 |
| WO | 00018130 | 3/2000 |
| WO | WO01080477 | 10/2001 |
| WO | WO03001725 A1 | 1/2003 |
| WO | WO03026316 | 3/2003 |
| WO | WO03077462 A1 | 9/2003 |
| WO | 2004056028 | 7/2004 |
| WO | WO2004056123 A1 | 7/2004 |
| WO | 2004084503 | 9/2004 |
| WO | WO2004091130 A1 | 10/2004 |
| WO | WO2005004374 A2 | 1/2005 |
| WO | WO2005039209 A1 | 4/2005 |
| WO | WO2005122025 A2 | 12/2005 |
| WO | 2007051156 | 5/2007 |
| WO | WO2007119086 | 10/2007 |
| WO | WO2008024890 A2 | 2/2008 |

OTHER PUBLICATIONS

Written Opinion—PCT/US06/060141—International Search Authority, European Patent Office—Mar. 21, 2007.
International Preliminary Report on Patentability—PCT/US06/060141—The International Bureau of WIPO, Geneva, Switzerland—Apr. 23, 2008.
"Video Codec Test Model, Near-Term Version 8 (TMN8) Revision 1," ITU-T Telecommunication Standardization Sector of ITU, Geneva, CH, vol. Q15/16, Sep. 8, 1997, pp. I-III, 1 XP001074663.
Fidler M, "Real-Time Multimedia StreaMs in a Differentiated Services Network." Computer Communications and Networks, 2001. Proceedings Tenth International Conference on Oct. 15-17, 2001, Piscataway, NJ, USA, IEEE, Oct. 15, 2001, pp. 380-385, XP010562121.
Hosein P et al: "Dynamic power headroom threshold for mobile rate determination in a CDMA network" Vehicular Technology Conference, 2004. VTC 2004-Spring. 2004 IEEE May 17-19, 2004, pp. 2404-2408, XP010766590.
Kalavakunta R et al: "Evolution of mobile broadband access technologies and services consideration and solutions for smooth migration from 2G to 3G networks" Oersonal Wireless Communications, 2005. IICPWC 2005. 2005 IEEE International Conference on Jan. 23-25, 2005, pp. 144-149, xp010799046.
Kamel I et al.: "A Study on Scheduling Multiple Priority Requests in Multimedia Servers," Multimedia Computing and Systems, 1999. IEEE International Conference on Florence, Italy Jun. 7-11, 1999, Los Alamitos, CA, USA, IEEE comput. Soc., US, vol. 2, Jun.-Jul. 1999, pp. 395-399, XP010519422.
Keller R et al.: "An Active Router Architecture for Multicast Video Disttibution," Infocom 2000. Nineteenth Annual joint Conference of the IEEE Computer and Communications Societies. Proceedings IEEE Tel Aviv, Israel Mar. 26-30, 2000, Piscataway, NJ, USA, pp. 1137-1146.
Lakshman T et al.: "The Drop from Front Strategy in TCP and in TCP over ATM," Proceedings of IEEE Infocom 1996. Conference on Computer Communications. Fifteenth Annual Joint Conference of the IEEE Computer and Communications Societies. Networking the Next Generation, Mar. 24-28, 1996, vol. 3, conf. 15, Mar. 24, 1996, pp. 1242-1250. XP000622260.
Meng-Huang Lee et al.: "A Predictable High-Throughput File System for Video Conference Recording," Systems, Man and Cybernetics, 1995. Intelligent Systems for the 21st Century, IEEE International Conference on Vancouver, BC, Canada Oct. 22-25, 1995, New York, vol. 5, Oct. 22, 1995, pp. 4296-4301, XP010195015.
Reininger D et al.: "VBR MPEG Video Coding with Dynamic Bandwidth Renegotiation," Communications-Gateway to Globalization. Proceedings of the Conference on Communications. Seattle, Jun. 18-22, 1995, ICC, New York, IEEE, US, vol. 3, Jun. 18, 1995, pp. 1773-1777.
Zhihai HE et al.: "A Linear Source Model and a Unified Rate Control Algorithm for DCT Video Coding," IEEE Transactions on Circuits and Systems for Video Technology, IEEE Service Center, Piscataway, NJ, US, vol. 12, No. 11, Nov. 2002, pp. 970-982, XP011071890.
Zhihai HE et al.: "Optimum Bit Allocation and Accurate Rate Control for Video Coding via rho-Domain Source Modeling," IEEE Transactions on Circuits and Systems for Video Technology, IEEE Service Center, Piscataway, NJ, US, vol. 12, No. 10, Oct. 2002, pp. 840-849, XP011071878.
3GPP2 C.S0024-A: "cdma2000 High rate Packet Data Air Interface Specification," version 1.0, p. 11-143, Mar. 2004.
ITU-T H.263 " Series: H Audiovisual and Multimedia Systems Infrastructure of Audiovisual services-Coding of Moving video- Video Coding for Low Bit Rate Communication," (Jan. 2005).
RFC 2190 C. Zhu et al.: "RTP Payload Format for H.263 Video Streams," Network Working Group, pp. 1-12, Sep. 1997.
RFC 2429 C, Borman et al.: "RTP Payload Format for the 1998 Version of ITU-T Rec. H.263 Video (H.263+)," Network Working Group, pp. 1-17, Oct. 1998.
RFC 3016 Y. Kikuchi et al.: "RTP Payload Formal for MPEG-4 Audio/Visual Streams," Network Working Group, pp. 1-21, Nov. 2000.
Myeong-Jin Lee et al.: "Video Frame Rate Control for Non-Guaranteed Network Services with Explicit Rate Feedback," Proceedings of Global Telecommunications Conference, pp. 293-297, 2000, XP002427548.
Taiwanese Search report—095139067—TIPO—Apr. 29, 2010.
Text Description of Joint Model Reference Encoding Methods and Decoding Concealment Methods, Joint Video Team (JVT) of ISO/IEC MPEG and ITU-T VCEG Hong Kong, Jan. 2005. Sections 2.1.2.1.2, 2.1.3.1.1, 2.5, 3.1, 3.3.
"TIA/EIA/IS-856 CDMA2000 High Rate Packet Data Air Interface Specification, " Apr. 2004.
3GPP TR 26.902 V1.0.0, "3RD Generation Partnership Project; Technical Specification Group Services and System Aspects; Video Codec Performance," (Release 7)(Mar. 2007).
3GPP TR 26.914, "Multimedia telphony over IP Multimedia Subsystem (IMS); Optimization opportunities" 2006.
3GPP TS 26.114 v1.2.0 (Dec. 13, 2006), "3rd Generation Partnership Project; Technical Specification Group Services and System Aspects-IP multimedia subsystem (IMS) multimedia telephony; media handling and interaction," (Release 7) TSG-SA4 internal working draft.
3GPP TS 34.108 v6.5.0, "3rd Generation Partnership Project; Technical Specification Group Radio Access Network Common test environment for UE conformance testing," (Release 6) (Dec. 2006).
3GPP2 C.R1008 v1.0, "cdma2000 Multimedia evaluation methodologies," Jan. 12, 2007.
3GPP2: "Packet Switched Video Telephony Services (PSVT/MCS)" 3GPP2, C.S0055-0, Version 1.0, Dec. 2007, XP002542622 p. 32, paragraph - p. 33.
D. Morikawa et al.: A feedback rate control of video stream in best-effort high -speed mobile packet network, The 5th Int. Symp. Wireless Personal Multimedia Comm., Oct. 27-30, 2002.
D. Singer et al., "A general mechanism for RTP Header Extensions," RFC 5285, IETF Internet Draft (Jul. 2008).
G.Cheung et al., "Video transport over wireless networks," IEEE Trans. Multimedia, Aug. 2005, pp. 777-785.
H. Schulzrinne et al.,"RTP: A Transport Protocol for Real-Time Applications," IETF RFC 3550 (2003).
Hari Garudadri et al.: "Feedback Based Network Adaptive Source Coding for Packet Switched Multimedia Telephony," Qualcomm Inc.—PSVT: Feedback base rate control; version 0.6 May 26, Sep. 13, Sep. 19, 2006, pp. 1-9.
Harinath Garudadri et al.: "Rate Adaptation for Video Telephony in 3G Networks" Nov. 12-13, 2007, pp. 342-348.
I. Johansson et al., "Support for non-compound RTCP in RTCP AVPF profile, opportunities and consequences," IETF Internet Draft Dec. 20, 2006; Expires Jun. 23, 2007.
ISO/IEC 14496-2, International Standard, Information technology—Coding of audio-visual objects—Part 2: Visual, Third edition Jun. 1, 2004.
ITU-T H.264, Series H: Audiovisual and Multimedia System Infrastructure of audiovisual services, Coding of moving video, "Advanced video coding for generic audivisual services," Nov. 2007: 7.3.5.3 Residual Data Syntax; and 9.2 CALVIC parsing process.
"ITU-T Study Group 16, rate control for low-delay video communications," No. q15-A-20, 1997.
Kueh V Y H et al.: "Performance evaluation of SIP-based session establishment over satellite-UMTS" VTC 2003-Spring. The 57th IEEE Semiannual Vehicular Technology Conference Proceedings. Apr. 22-25, 2003, vol. 2, Apr. 22, 2003, pp. 1381-1385, XP010862.
Lee M et al: "Video Frame Rate Control for Non-Guaranteed Network Services With Explicit Rate Feedback" IEEE Telecommunication Conference, Nov. 27-Dec. 1, 2000; vol. 1, Nov. 27, 2000, pp. 293-297, XP001195580.
Lei Z et al.: "Adaptive video transcoding and streaming over wireless channels" Journal of Systems & Software, vol. 75, No. 3, Mar. 1, 2005, pp. 253-270, XP004656968.
Lu, X; et. al: "Understanding video quality and its use in feedback control" Packet Video 2002, Pittsburgh,PA USA 2002.
Masoud Khansari et al: "Low Bit-Rate Video Transmission over Fading Channels for Wireless Microcellular Systems", IEEE Transactions on Circuits and Systems for Video Technology, IEEE Service Center, Piscataway, NJ, US, vol. 6, No. 1, Feb. 1, 1996, XP011014283, ISSN: 1051-8215.

OTT Helsinki University of Technology S Wenger Nokia N Sato Oki C Burmeister J Rey Matsushita J: "Extended RTP Profile for Real-time Transport Control Protocol (RTCP)-Based Feedback (RTP/AVPF); rfc4585.txt" IETF Standard, Internet Engineering Task Force, IETF, Ch, Jul. 1, 2006, XP015055018 ISSN: 0000-0003 abstract p. 31, paragraph 6-p. 41.

Ruiz, P. et el.: "Adaptive Multimedia Applications to Improve User-perceived QoS in Multihop Wireless AI hoc Networks," Proceedings of the IEEE Int-mation-1 Conference on Wireless Lane and Horne Networks (1CWLHN 2002) Online] Aug. 2002, pp. 673-684, XP002466712.

Technical Specification Group Radio Access Network: "3GPP TR25. 848 V4.0.0 Physical Layer Aspects of UTRA High Speed Downlink Packet Access (Release 4)" 3GPP TR 25.848 V4.0.0, Mar. 2001, pp. 1-89, XP002189517.

Translation of Korean application 2008-7029470 corresponding to U.S. Appl. No. 11/445,099, citing KR2005-45667 (KR pub KR20060046281) dated Apr. 30, 2010 (060767KR).

T.V. Lakshman et al.: "Transporting compressed video over ATM networks with explicit-rate feedback control," IEEE Trans. Networking, Oct. 1999, vol. 7, No. 5, pp. 710-723.

T.V. Lakshman et al.: "VBR Video: Tradeoffs and Potentials", Proceeding of the IEEE, May 1998, vol. 86, No. 5, pp. 952-973.

"Universal Mobile Telecommunications System (UMTS); Radio Link Control (RLC) Protocol Specification (3GPP TS 25.322 version 6.9.0 Release 6); ETSI TS 125.322" ETSI Standards, LIS, vol. 3-R2, No. v6.9.0, Sep. 1, 2006, XP014035577.

Y.-G. Kim et al.: "TCP-frendly internet video with smooth and fast rate adaption and networks-aware error control," IEEE Trans. Circ. Sys. Vid. Tech., Feb. 2004, vol. 14, No. 2, pp. 256-268.

Kang, K., et al., "Dynamic Rate Control Mechanism for Large Scale Sessions," Twelfth International Conference on Information Networking Proceedings, 1998. (ICOIN-12). Tokyo, Japan, Jan. 21-23, 1998, pp. 21-24, XP010265270, ISBN: 978-0/8186-7225-5., doi: 10.1109/ICOIN.1998.648346.

Stockhammer, Thomas. "Progressive Video Transmission for Packet Lossy Channels Exploiting Feedback and Unequal Erasure Protection," International Conference on Image Processing (ICIP), vol. 2, (Sep. 22, 2002), pp. 169-172, XP010607935, ISBN: 978-0-7803-7622-9.

3GPP S4-060613 "MTSI Dynamic Video Rate Adaptation", Nov. 2006, pp. 1-6.

3GPP TS 26.234 v7.1.0 (Dec. 2006), 3rd Generation Partnership Project; Technical Specification Group Services and System Aspects; Transparent end-to-end Packet-switched Streaming Service (PSS); Protocols and codecs (Release 7) pp. 35-39, 41-42, and 49-52.

"Simulation Results for MTSI Dynamic Video Adaptation Signalling", 3GPP TSG-SA WG4 #42 S4-070056, Jan. 29, 2007, pp. 1-12.

Qun-Hua, Wang et al., "The Application of a Simple TCP-friendly Congestion/Rate Control Arithmetic on Multimedia Teaching System", Computer and Information Technology, Apr. 30, 2007, pp. 28-30, vol. 15 No. 2.

* cited by examiner

REVERSE LINK LOWER LAYER ASSISTED VIDEO ERROR CONTROL

CLAIM OF PRIORITY

This application is a continuation-in-part application and claims priority to co-assigned U.S. patent application Ser. No. 11/315,399, filed on Dec. 21, 2005, entitled "METHODS AND SYSTEMS FOR ADAPTIVE ENCODING OF REAL-TIME INFORMATION IN PACKET-SWITCHED WIRELESS COMMUNICATION SYSTEMS", which claims priority to U.S. Provisional Application No. 60/729,017, filed on Oct. 21, 2005, which are hereby incorporated by reference in their entirety.

TECHNICAL FIELD

The disclosure relates to video encoding and, more particularly, to reverse link lower layer assisted video error control.

BACKGROUND

A cellular phone may include an audio capture device, such as a microphone or speech synthesizer, and an audio encoder to generate audio packets (or frames). The phone may use communication protocol layers and modules, such as a radio link protocol (RLP) module, a medium access control (MAC) layer, and a physical (PHY) layer. The phone may place audio packets in a RLP queue. A MAC layer module may generate MAC layer packets from contents of the RLP queue. The MAC layer packets may be converted to PHY layer packets for transmission across a communication channel to another communication device.

SUMMARY

One aspect relates to a method comprising: encoding video data; forming an Internet protocol (IP) packet with the encoded video data; transmitting the packet across a wireless channel to an access network; at a medium access control (MAC) layer, receiving a negative acknowledgement (NAK) from the access network; determining whether the received NAK is associated with a packet that contains video data; determining which IP packet contains data that was lost in transmission; and if the received NAK is associated with a packet that contains video data, performing error control.

Another aspect relates to a method comprising: encoding a first frame of video data; forming a packet with the encoded first frame of video data; transmitting the packet across a wireless channel to an access network; before encoding a second frame of video data, determining whether a medium access control (MAC) layer received a negative acknowledgement (NAK) from the access network; determining whether the received NAK is associated with a packet that contains video data; and if the received NAK is associated with a packet that contains video data, then performing error control.

Another aspect relates to an apparatus comprising a machine-readable memory storing a set of instructions configured to: encode video data; form an Internet protocol (IP) packet with the encoded video data; transmit the packet across a wireless channel to an access network; at a medium access control (MAC) layer, receive a negative acknowledgement (NAK) from the access network; determine whether the received NAK is associated with a packet that contains video data; determine which IP packet contains data that was lost in transmission; and if the received NAK is associated with a packet that contains video data, perform error control.

Another aspect relates to an apparatus comprising a machine-readable memory storing a set of instructions configured to: encode a first frame of video data; form a packet with the encoded first frame of video data; transmit the packet across a wireless channel to an access network; before encoding a second frame of video data, determine whether a medium access control (MAC) layer received a negative acknowledgement (NAK) from the access network; determine whether the received NAK is associated with a packet that contains video data; and if the received NAK is associated with a packet that contains video data, then perform error control.

Another aspect relates to an apparatus comprising: a video encoder configured to encode video data; a module configured to form an Internet protocol (IP) packet with the encoded video data; a transceiver configured to (a) transmit the packet across a wireless channel to an access network, and (b) receive a medium access control (MAC) layer negative acknowledgement (NAK) from the access network; wherein the module is configured to determine whether the received NAK is associated with a packet that contains video data and determine which IP packet contains data that was lost in transmission; and if the received NAK is associated with a packet that contains video data, the video encoder is configured to perform error control.

An apparatus comprising: a video encoder configured to encode a first frame of video data; a first module configured to form a packet with the encoded first frame of video data; a transceiver configured to (a) transmit the packet across a wireless channel to an access network and (b) receive a medium access control (MAC) layer negative acknowledgement (NAK) from the access network; before encoding a second frame of video data, a second module configured to determine whether the MAC layer received a NAK from the access network and determine whether the received NAK is associated with a packet that contains video data; and an error control module configured to perform error control if the received NAK is associated with a packet that contains video data.

The details of one or more embodiments are set forth in the accompanying drawings and the description below.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Video and Audio Encoding and Transmission

Figure 1:
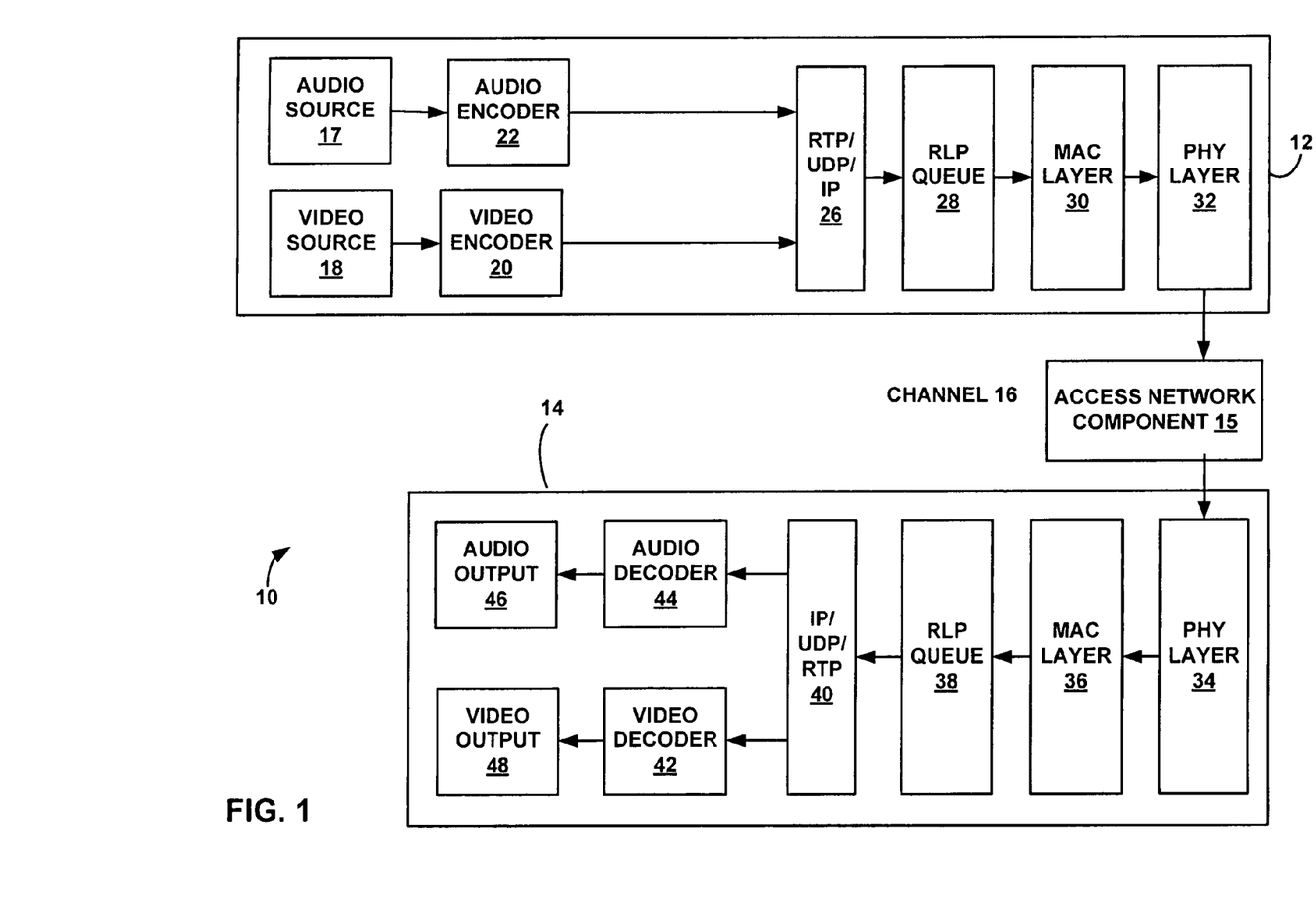
FIG. 1 illustrates a communication system with a video and audio encoder device sending data across a transmission channel to a decoder device.

FIG. 1 illustrates a communication system 10 with a video and audio encoder device 12 sending data across a transmission channel 16 (including an access network component 15) to a decoder device 14. The encoder device 12 and decoder device 14 may be dispersed throughout the system 10. The encoder device 12 and decoder device 14 may represent various types of devices, such as a wireless phone, a cellular phone, a laptop computer, a wireless multimedia device, a wireless communication personal computer (PC) card, a personal digital assistant (PDA), an external or internal modem, or any device that communicates through a wireless channel.

The encoder device 12 and decoder device 14 may each have various names, such as access terminal (AT), access unit, subscriber unit, mobile station, mobile device, mobile unit, mobile phone, mobile, remote station, remote terminal, remote unit, user device, user equipment, handheld device, etc.

Each device 12, 14 may communicate with an access network (AN) component 15 on a forward link (FL) and/or a reverse link (RL). The FL (or downlink) refers to transmission from the AN 15 to a device 12, 14. The reverse link (or uplink) refers to transmission from a device 12, 14 to the AN 15. The AN 15 may refer to the network portion of a communication system, and may include (but is not limited to) or implement the function of a base station (BS), a base-station transceiver system (BTS), an access point (AP), a modem pool transceiver (MPT), a Node B (e.g., in a WCDMA type system), etc.

The encoder device 12 may be in a first video communication device and may include an audio source 17, video source 18, video encoder 20, audio encoder 22, real-time transport protocol (RTP)/user datagram protocol (UDP)/Internet protocol (IP) conversion module 26, radio link protocol (RLP) queue 28, MAC layer module 30 and physical (PHY) layer module 32. Other embodiments of the encoder device 12 may include other elements instead of or in addition to the elements shown in FIG. 1. Other embodiments of the encoder device 12 may include fewer elements than those shown in FIG. 1.

The decoder device 14 may be in another video communication device and may include a PHY layer module 34, MAC layer module 36, RLP queue 38, RTP/UDP/IP conversion module 40, video decoder 42, audio decoder 44, audio output unit 46 and video output unit 48. Other embodiments of the decoder device 14 may include other elements instead of or in addition to the elements shown in FIG. 1. Other embodiments of the decoder device 14 may include fewer elements than those shown in FIG. 1.

The system 10 may provide bi-directional video and audio transmission, such as video telephony (VT), via the channel 16. Reciprocal encoding, decoding, and conversion modules may be provided on opposite ends of the channel 16. In some embodiments, the encoder device 12 and decoder device 14 may be embodied within video communication devices such as wireless mobile terminals equipped for video streaming, VT, or both. The mobile terminals may support VT according to packet-switched standards such as RTP, UDP or IP.

The video source 18 may be a video capture device, such as a video camera, one or more video archives, or a combination of a video camera and video archives. The video encoder 20 generates encoded video data packets according to a video compression method, such as MPEG-4. Other video compression methods may be used, such as the International Telecommunication Union (ITU) H.263, ITU H.264, or MPEG-2 methods. The video encoder 20 may provide a video source rate control scheme that is generally CODEC-dependent. For example, the video encoder 20 may be adapted for video encoding according to MPEG4, ITU H.263 or ITU H.264. Video encoder 20 may be implemented by a DSP or embedded logic core.

The audio source 17 may be an audio capture device, such as a microphone, or a speech synthesizer device. The audio encoder 22 may encode audio data and generate audio packets to accompany the video data. The audio data may be encoded according to an audio compression method, such as adaptive multi-rate narrow band (AMR-NB), or other techniques. For VT applications, the video will permit viewing of a party to a VT conference, and the audio will permit the speaking voice of that party to be heard.

The RTP/UDP/IP conversion module 26 obtains video and audio data packets from video encoder 20 and audio encoder 22. The RTP/UDP/IP conversion module 26 may add appropriate RTP/UDP/IP header information to the audio and video data packets received from the audio encoder 22 and video encoder 20, and place the data packets in the RLP queue 28. RTP may run on top of UDP. UDP may run on top of IP. IP may run on top of a point-to-point protocol (PPP) layer in one configuration.

The MAC layer module 30 may retrieve RLP packets from RLP queue 28 and generate MAC layer packets. Each MAC layer packet may carry RTP/UDP/IP header information and audio or video packet data that is contained within RLP queue 28.

Audio packets may be inserted into RLP queue 28 independently of video packets. In some cases, a MAC layer packet generated from the contents of RLP queue 28 will carry only header information and video packet data. In other cases, the MAC layer packet will carry only header information and audio packet data. In other cases, the MAC layer packet will carry header information, audio packet data and video packet data, depending on the contents of RLP queue 28. The MAC layer packets may be configured according to a radio link protocol (RLP), and may be referred to as MAC RLP packets.

The PHY layer module 32 may convert the MAC RLP packets into PHY layer packets for transmission over the channel 16. The channel 16 carries the PHY layer packets to the decoder device 14.

In the decoding device 14, the PHY layer module 34 and MAC layer module 36 may operate in a reciprocal manner. The PHY layer module 34 may identify the MAC layer packets from the PHY layer packets and convert/reassemble PHY layer packets received from channel 16 to MAC RLP packets.

The MAC layer module 36 may reassemble the contents of the MAC RLP packets to provide video and audio packets for insertion of the MAC RLP packets into the RLP queue 38. The RTP/UDP/IP conversion module 40 may remove/strip the accompanying header information from the data in the RLP queue 38, and reassemble the video and audio data for delivery to the video decoder 42 and audio decoder 44, respectively.

Video decoder 42 decodes the video data frames to produce a stream of video data for use in driving a display device (video output) 48. Audio decoder 44 decodes the audio data to produce audio information for presentation to a user, e.g., via an audio speaker (audio output) 46.

Video telephony (VT) refers to real-time communication of audio and video packets between at least two devices, such as systems 12 and 14. In mobile VT applications, a VT device (wireless terminal) receives PHY layer packets via a wireless forward link (FL) (i.e., "downlink") from a base station. A VT device transmits PHY layer packets via a wireless reverse link (RL) (i.e., "uplink") to the base station.

The system 10 and channel 16 may be designed to support one or more wireless communication technologies such as code division multiple access (CDMA), frequency division multiple access (FDMA), time division multiple access (TDMA), or orthogonal frequency divisional multiplexing (OFDM), or another suitable wireless technique. The above wireless communication technologies may be delivered according to any of a variety of radio access technologies. For example, CDMA may be delivered according to cdma2000 or wideband CDMA (WCDMA) standards. TDMA may be delivered according to the Global System for Mobile Communications (GSM) standard. The Universal Mobile Telecommunication System (UMTS) standard permits GSM or WCDMA operation. For VT applications, the system 10 may be designed to support high data rate (HDR) technologies such as cdma2000 1× EV-DO, Release 0, Revision A, or subsequent EV-DO releases.

Channel conditions may be a concern for wireless channels, but may be especially problematic for mobile VT applications, in which channel conditions may suffer from fading or network congestion.

Video Error Control

Lower layer assisted video error control methods may address errors that occur to video data during transmission on the reverse link. The methods may enable the video encoder 20 to use channel error information from the MAC layer 30 and immediately apply error control, without waiting for feedback from the receiving device 14. The methods may use mechanisms to retrieve/receive error information that can be understood by the video encoder 20. Depending on desired implementation complexity, the error information from the MAC layer 30 can be transformed into two different formats.

After receiving error messages from lower layers, the video encoder 20 may (a) use a different reference frame for a new frame, (b) increase macroblock (MB)-intra refresh rate, or (c) insert an intra-frame (I-frame) to stop error propagation at the receiver. Inserting an I-frame is basically the same as forcing an intra-refresh. In an I-frame, every MB is intra-coded, i.e., it does not depend on the previous frame, which can stop the error propagation. For MB-intra refresh, only some MBs are intra-coded. Option (c) may avoid using periodic I-frames (or decrease intra-frame refresh rate) to improve coding efficiency and video delay, as well as provide better video quality when errors occur. The video quality can be better because the video encoder 20 may wipe out the errors at once, instead of gradually refreshing each MB in the subsequent frames.

Figure 5:
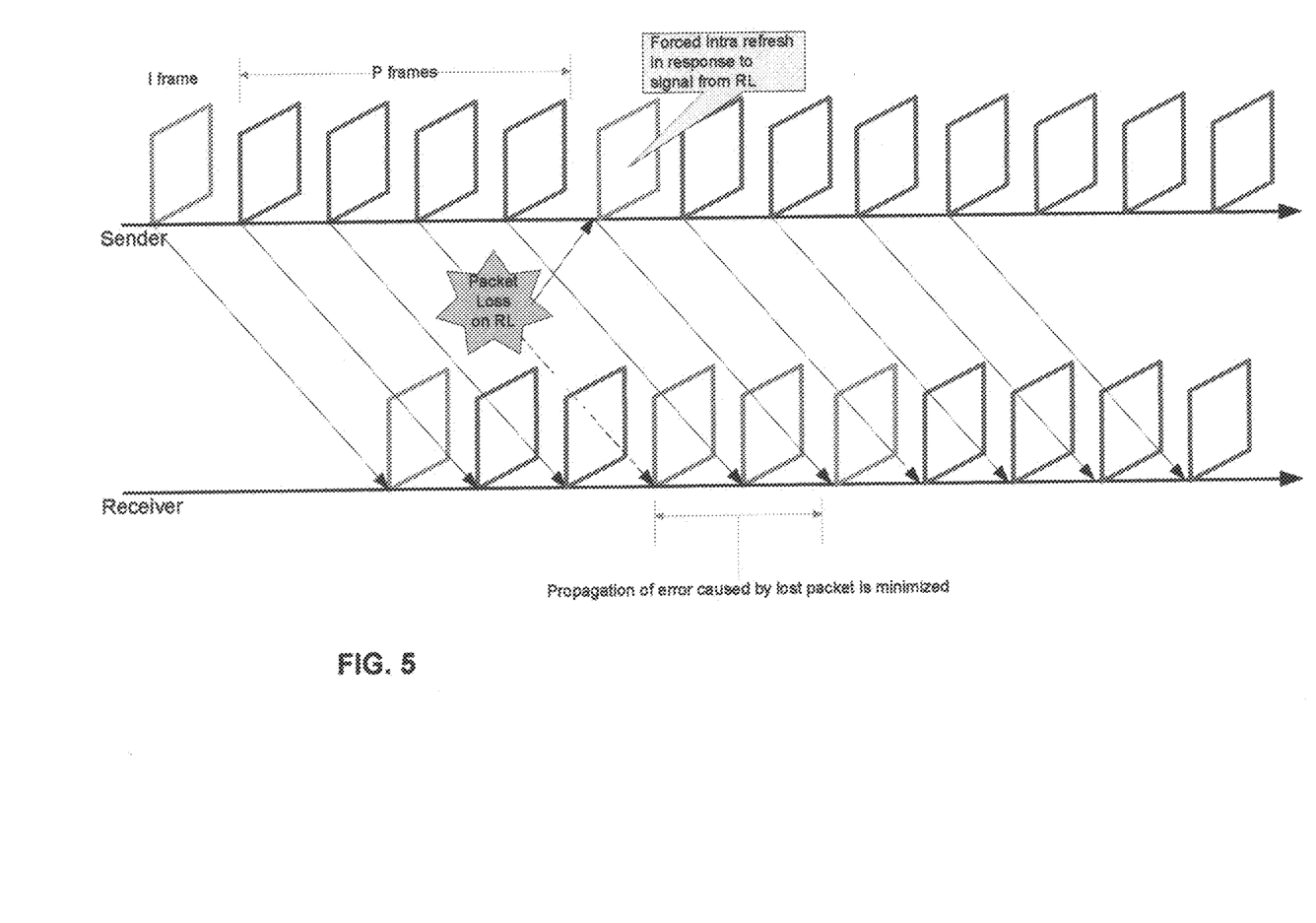
FIG. 5 illustrates an example of detecting a lost packet and forcing an intra refresh, which minimizes error propagation caused by a lost packet.

FIG. 5 illustrates an example of detecting a packet loss and forcing an intra refresh, which minimizes error propagation caused by a lost packet.

A CDMA2000 1×EV-DO Rev A reverse link is used below as one example of receiving/retrieving error information from the MAC layer 30. The methods may also be applied to other communication systems, such as WCDMA High Speed Uplink Packet Access (HSUPA) system, which use H-ARQ, NAK or other similar approach to detect transmission errors and/or lost information.

The methods described below may provide a cross-layer optimization for error performance in multimedia over wireless networks, including video telephony and video sharing, where transmission errors may be inevitable.

For forward link (downlink) transmission errors, some methods may use end-to-end feedback to provide error information. However, if these methods solely rely on end-to-end feedback, they may not respond to RL transmission errors quickly enough to reduce artifacts caused by lost packets. The RL methods described herein may compliment the end-to-end feedback approach.

MAC-Assisted Video Error Control using NAK Information

This section describes two MAC-assisted video error control methods that use negative acknowledgment (NAK) information from the access network 15. In both methods, the video encoder 20 or error control module 206 may query the MAC layer 30 on a frame-by-frame basis, i.e., before encoding a new frame, the video encoder 20 may receive error information from one or more lower layers and perform error control if needed. Based on an error information message type, the video encoder 20 may perform different error control schemes to mitigate error propagation.

First Approach: Error Control using Video Flow IP Packet NAK

Figure 2:
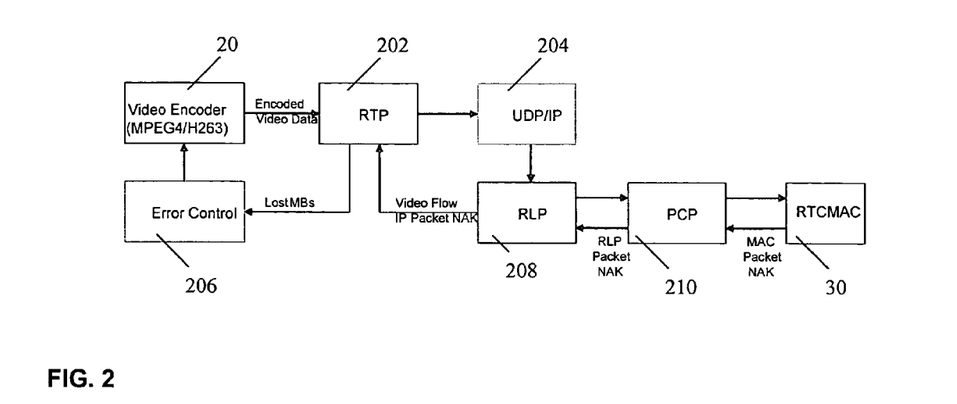
FIG. 2 illustrates a method and structure for a first approach to detect and control errors, which may be used in the system of FIG. 1.

FIG. 2 illustrates a method and structure for a first approach where the video encoder 20 or error control module 206 is informed of which macroblocks (MBs) in a video frame were lost in transmission. Each video frame may comprise many macroblocks.

When a transmission error occurs, the access network 15 sends a NAK to the reverse traffic channel MAC (RTCMAC) layer 30. The MAC layer 30 informs a packet consolidation protocol (PCP) module 210 of the MAC packet associated with the NAK.

The PCP module 210 determines if the lost MAC packet contains any video flow data. Audio and video data can be placed in the same MAC packet, even though quality of service (QoS) is supported in the EV-DO Rev A reverse link. If there is video data in the lost MAC packet, the PCP module 210 will inform the RLP module 208 which RLP queue (there may be several RLP queues) contains a packet that experienced an error in transmission with a RLP packet NAK.

The RLP module 208 determines which IP packet contains the lost data. The RLP module 208 has knowledge of an IP packet. For EV-DO Rev A, a video flow is configured such that a Link Flow data unit is an IP packet. Then the RLP module 208 informs a RTP layer 202 in an application layer which IP packet has been lost with a video flow IP packet NAK.

The RTP layer 202 maintains a map or table that will convert the lost IP packet into lost MBs in a frame. Then the information of the lost MBs will be passed to the error control module 206 and/or video encoder 20 for further error control.

This first approach may involve modifications at three different layers:

- The video encoder 20 passes information of MBs in each packet to the RTP layer 202.
- The RTP layer 202 maintains a conversion map or table between IP packets (indexed by sequence numbers) and macroblocks. If an IP packet is lost, the RTP layer 202 can convert the IP packet to macroblocks and inform the video encoder 20 of the lost MBs. The sequence number associated with each IP packet may also be passed to the RLP module 208.
- The RLP module 208 keeps track of how the IP packets are fragmented into RLP packets and determines which IP packet is lost by checking the sequence number.

For error control, since the video encoder 20 knows which MBs are lost, the video encoder 20 or error control module 206 can perform one or more of the following error control methods:

Restrict motion estimation search range so that the damaged (lost) part will not be used as the prediction.

Intra-code the co-located MBs and their neighboring MBs.

Use different reference frames for the co-located MBs.

Second Approach: Error Control using Video Flow NAK

The first approach described above may provide good error control capability and performance, but the implementation complexity may be relatively high. The first approach may need to modify the RTP and RLP layers 202, 208. A second approach may provide a simplified yet effective approach for error control.

Figure 3:
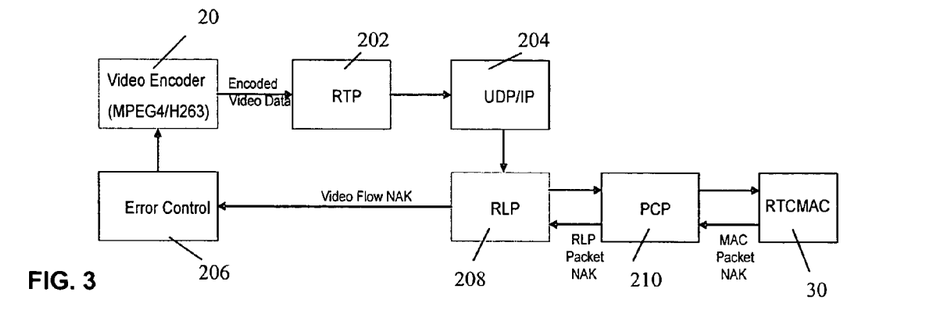
FIG. 3 illustrates a method and structure for a second approach to detect and control errors, which may be used in the system of FIG. 1.

FIG. 3 illustrates a method and structure for the second approach. Compared to FIG. 2, FIG. 3 may not require modification of the RTP layer 202. In fact, the second approach may not need the RTP layer 202 to perform any operation. Instead, the video encoder or error control module 206 may query the RLP module 208 before encoding each new frame of video data, and error information may be passed directly to the video encoder 20 or error control module 206 for error control. This error message may simply be a flag (e.g., a binary bit) set in the RLP module 208 that informs the video encoder 20 if there has been any data lost on a video flow since the last time the MAC layer 30 was queried. In one embodiment, the MAC layer 30 may automatically send a NAK to the PCP module 210, which sends a NAK to the RLP module 208, which sets a flag without any queries to the PCP or MAC layers 210, 30.

Between encoding two video frames, the video encoder 20 may just need to know whether any data was lost in the previous frame so the video encoder 20 or error control module 206 can perform error control on the current frame. Since the encoder 20 or error control module 206 queries the RLP module 208 on a frame-by-frame basis, i.e., before encoding a new frame, knowing if there is any transmission error may be just as good as knowing which IP packet was lost.

If the MAC layer automatic repeat request (MARQ) is used for the video flow, this flag should be set only when the MARQ packet containing video data is not positively acknowledged (ACK) at the physical layer.

This second approach greatly may simplify the implementation complexity and provide useful information for the video encoder 20 to perform proper error control. However, since the flag may only indicate if there has been an error or not, the video encoder 20 may not know which part of the frame is lost. Therefore, the error control should assume the error may happen in any part of any frame since the last query.

Once this flag is set, the video encoder 20 may perform one or more of the following error control methods, which may be different from the first approach:

Encode the current frame as an I-frame.

Increase percentage of intra-coded MBs.

Use the frame before the previous frame as a reference for motion estimation.

Figure 4:
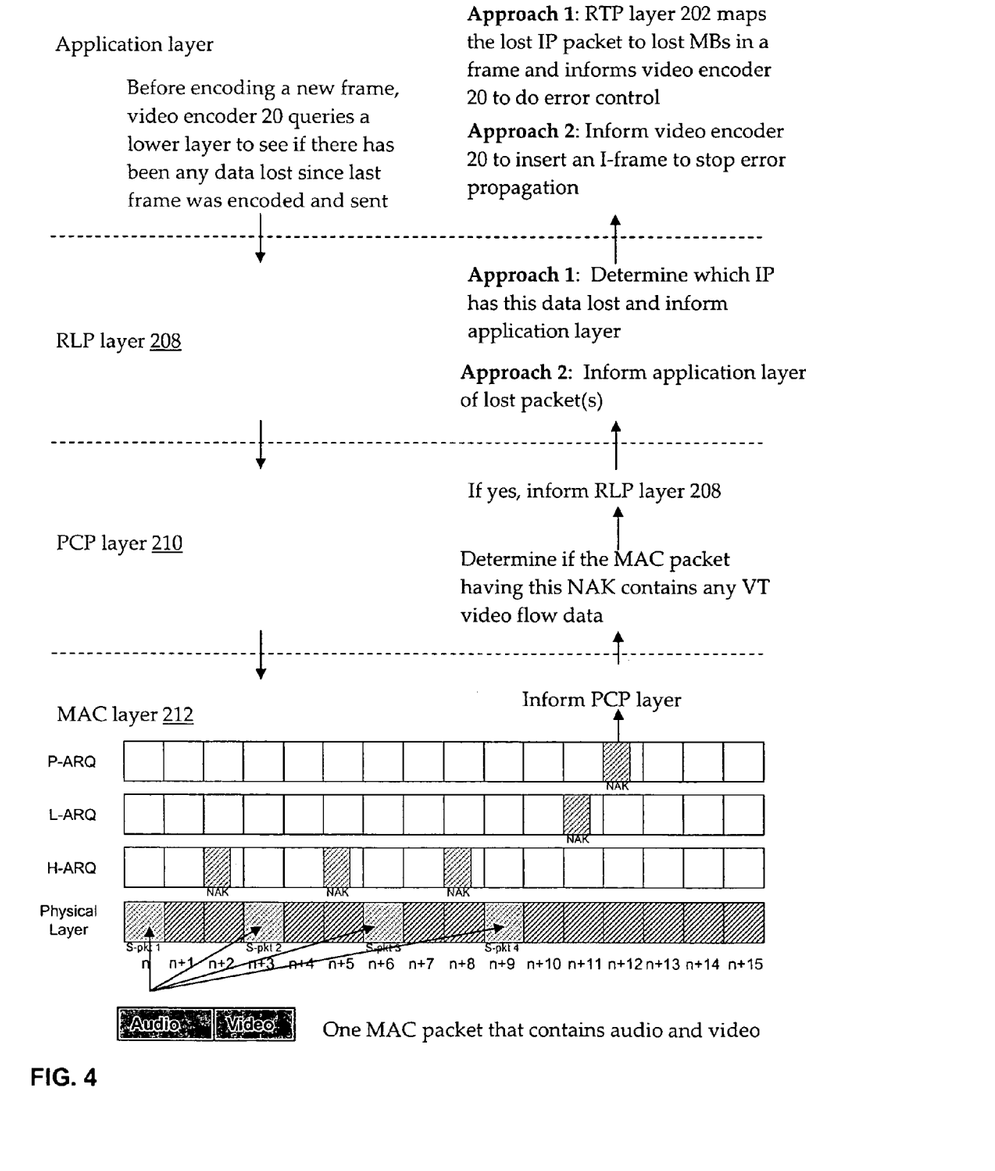
FIG. 4 further illustrates the first and second approaches of FIGS. 2 and 3.

FIG. 4 further illustrates the first and second approaches. EV-DO Rev A reserve link channel is used as an example, but other types of channels, standards and communication protocols may be used. Near the bottom of FIG. 4, the MAC layer 30 sends a MAC packet containing audio and video data to the physical layer 32 as a first subpacket in time slot n. For example, there may be 50 packet transmissions per second at the MAC layer 30, assuming 12-slot termination and all these MAC packets carry video data. An EV-DO physical layer may enable an access terminal to detect a lost packet over the reverse link almost instantaneously.

The MAC layer 30 receives a NAK from a base station through hybrid ARQ (H-ARQ) channel. The MAC layer 30 tries sending a second subpacket during time slot n+3. The MAC layer 30 receives a second NAK from the base station again through H-ARQ channel. The MAC layer 30 tries sending a third subpacket during time slot n+6. The MAC layer 30 receives a third NAK from the base station again through H-ARQ channel. The MAC layer 30 tries sending a fourth subpacket during time slot n+9. The MAC layer 30 receives a NAK from a base station through last ARQ (L-ARQ) channel and also receives a NAK from a base station through packet ARQ (P-ARQ) channel. This causes the MAC layer 30 to inform the PCP module 210.

The second approach may allow the video encoder 20 to quickly recover after the errors, and the user may not see degraded quality video. The second approach may insert an I-frame right after the errors to immediately stop error propagation. When there is no error, the second approach may provide better quality and less frame skipping due to I-frames than other methods.

Video encoder device 12 may have a dedicated memory for storing instructions and data, as well as dedicated hardware, software, firmware, or combinations thereof. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

The techniques described in this disclosure may be implemented within a general purpose microprocessor, digital signal processor (DSP), application specific integrated circuit (ASIC), field programmable gate array (FPGA), or other equivalent logic devices. For example, video encoder device 12, video decoder device 14, and associated components and modules, may be implemented as parts of an encoding process, or coding/decoding (CODEC) process, running on a digital signal processor (DSP) or other processing device. Accordingly, components described as modules may form programmable features of such a process, or a separate process.

Video encoder device 12 may have a dedicated memory for storing instructions and data, as well as dedicated hardware, software, firmware, or combinations thereof. If implemented in software, the techniques may be embodied as instructions executable by one or more processors. The instructions may be stored on a computer-readable medium such as random access memory (RAM), read-only memory (ROM), non-volatile random access memory (NVRAM), electrically erasable programmable read-only memory (EEPROM), FLASH memory, magnetic or optical data storage device, or the like. The instructions cause one or more processors to perform certain aspects of the functionality described in this disclosure.

Various embodiments have been described. These and other embodiments are within the scope of the following claims.

The invention claimed is:

1. A method comprising:

encoding video data and audio data by an encoder device;

forming an Internet protocol (IP) packet with the encoded video data and an IP packet with the encoded audio data using a module of the encoder device;

transmitting the packets across a wireless channel to an access network using a transceiver of the encoder device;
at a medium access control (MAC) layer of the encoder device, receiving a negative acknowledgement (NAK) from the access network;
determining, using the module of the encoder device, whether the received NAK is associated with a packet that contains video data;
determining, using the module of the encoder device, which IP packet contains data that was lost in transmission; and
only if the received NAK is associated with a packet that contains video data, performing error control by the encoder device.

2. The method of claim 1, wherein the packet with the encoded video data comprises macroblocks (MBs) of video data, the method further comprising passing information of the macroblocks from a video encoder to a real-time transport protocol (RTP) layer.

3. The method of claim 1, further comprising:
after encoding a frame of video data and before encoding a new frame of video data, querying the MAC layer to determine whether the MAC layer received a NAK; and
if the MAC layer received a NAK, performing error control.

4. The method of claim 1, further comprising informing a packet consolidation protocol (PCP) module of the received NAK.

5. The method of claim 1, further comprising, if the received NAK is associated with a packet that contains video data, informing a radio link protocol (RLP) module of the received NAK.

6. The method of claim 5, further comprising determining which RLP queue contains a packet that experienced an error in transmission.

7. The method of claim 1, further comprising informing an application layer of the packet associated with the received NAK.

8. The method of claim 1, further comprising:
maintaining a map between Internet protocol (IP) packets and macroblocks of video data;
after determining which IP packet contains data that was lost in transmission using the map to convert the IP packet into macroblocks of a video frame to determine which macroblocks were lost in transmission; and
performing error control for the macroblocks that were lost in transmission.

9. The method of claim 8, wherein error control comprises at least one of (a) restricting a motion estimation search range so that a damaged part will not be used as a prediction, (b) intra-code co-located macroblocks and neighboring macroblocks, and (c) using different reference frames for co-located macroblocks.

10. The method of claim 1, wherein the wireless channel comprises a code division multiple access 2000 1× Evolution Data Optimized Revision A (CDMA2000 1× EV-DO Rev A) channel.

11. The method of claim 1, wherein the wireless channel comprises a wideband code division multiple access (WCDMA) High Speed Up link Packet Access (HSUPA) channel.

12. A method comprising:
encoding a first frame of video data and audio data by an encoder device;
forming a packet with the encoded first frame of video data and a packet with the encoded audio data using a first module of the encoder device;
transmitting the packets across a wireless channel to an access network using a transceiver of the encoder device;
before encoding a second frame of video data by the encoder device, determining using a second module of the encoder device whether a medium access control (MAC) layer received a negative acknowledgement (NAK) from the access network;
determining, using the second module of the encoder device, whether the received NAK is associated with a packet that contains video data; and
only if the received NAK is associated with a packet that contains video data, then performing error control by the encoder device.

13. The method of claim 12, wherein determining whether a medium access control (MAC) layer received a negative acknowledgement (NAK) from the access network comprises checking whether a flag is set in a radio link protocol (RLP) module.

14. The method of claim 12, further comprising informing an application layer of the received NAK.

15. The method of claim 12, further comprising informing a video encoder of the received NAK.

16. The method of claim 12, further comprising setting a one-bit flag in a radio link protocol (RLP) module to indicate the MAC layer received a NAK.

17. The method of claim 12, wherein error control comprises at least one of (a) encoding the second frame as an I-frame, (b) increasing percentage of intra-coded macroblocks, and (c) using a frame before the first frame as a reference for motion estimation.

18. An apparatus comprising a machine-readable memory storing a set of instructions configured to:
encode video data and audio data;
form an Internet protocol (IP) packet with the encoded video data and an IP packet with the encoded audio data;
transmit the packets across a wireless channel to an access network;
at a medium access control (MAC) layer, receive a negative acknowledgement (NAK) from the access network;
determine whether the received NAK is associated with a packet that contains video data;
determine which IP packet contains data that was lost in transmission; and
only if the received NAK is associated with a packet that contains video data, perform error control.

19. The apparatus of claim 18, wherein the packet with the encoded video data comprises macroblocks (MBs) of video data, the instructions further comprising passing information of the macroblocks from a video encoder to a real-time transport protocol (RTP) layer.

20. The apparatus of claim 18, wherein the instructions are further configured to:
after encoding a frame of video data and before encoding a new frame of video data, query the MAC layer to determine whether the MAC layer received a NAK; and
if the MAC layer received a NAK, perform error control.

21. The apparatus of claim 18, wherein the instructions are further configured to inform a packet consolidation protocol (PCP) module of the received NAK.

22. The apparatus of claim 18, wherein the instructions are further configured to, if the received NAK is associated with a packet that contains video data, inform a radio link protocol (RLP) module of the received NAK.

23. The apparatus of claim 22, wherein the instructions are further configured to determine which RLP queue contains a packet that experienced an error in transmission.

24. The apparatus of claim 18, wherein the instructions are further configured to inform an application layer of the packet associated with the received NAK.

25. The apparatus of claim 18, wherein the instructions are further configured to:
 maintain a map between Internet protocol (IP) packets and macroblocks of video data;
 after determining which IP packet contains data that was lost in transmission use the map to convert the IP packet into macroblocks of a video frame to determine which macroblocks were lost in transmission; and
 perform error control for the macroblocks that were lost in transmission.

26. The apparatus of claim 25, wherein error control comprises at least one of (a) restricting a motion estimation search range so that a damaged part will not be used as a prediction, (b) intra-code co-located macroblocks and neighboring macroblocks, and (c) using different reference frames for co-located macroblocks.

27. The apparatus of claim 18, wherein the wireless channel comprises a code division multiple access 2000 1× Evolution Data Optimized Revision A (CDMA2000 1× EV-DO Rev A) channel.

28. The apparatus of claim 18, wherein the wireless channel comprises a wideband code division multiple access (WCDMA) High Speed Uplink Packet Access (HSUPA) channel.

29. An apparatus comprising a machine-readable memory storing a set of instructions configured to:
 encode a first frame of video data and audio data;
 form a packet with the encoded first frame of video data and a packet with the encoded audio data;
 transmit the packets across a wireless channel to an access network;
 before encoding a second frame of video data, determine whether a medium access control (MAC) layer received a negative acknowledgement (NAK) from the access network;
 determine whether the received NAK is associated with a packet that contains video data; and
 only if the received NAK is associated with a packet that contains video data, then perform error control.

30. The apparatus of claim 29, wherein determining whether the MAC layer received negative acknowledgement (NAK) the NAK from the access network comprises checking whether a flag is set in a radio link protocol (RLP) module.

31. The apparatus of claim 29, the instructions being further configured to inform an application layer of the received NAK.

32. The apparatus of claim 29, the instructions being further configured to inform a video encoder of the received NAK.

33. The apparatus of claim 29, the instructions being further configured to set a one-bit flag in a radio link protocol (RLP) module to indicate the MAC layer received a NAK.

34. The apparatus of claim 29, wherein error control comprises at least one of (a) encoding the second frame as an I-frame, (b) increasing percentage of intra-coded macroblocks, and (c) using a frame before the first frame as a reference for motion estimation.

35. An apparatus comprising:
 an encoder configured to encode video data and audio data;
 a module configured to form an Internet protocol (IP) packet with the encoded video data and an IP packet with the encoded audio data;
 a transceiver configured to (a) transmit the packets across a wireless channel to an access network, and (b) receive a medium access control (MAC) layer negative acknowledgement (NAK) from the access network;
 wherein the module is configured to determine whether the received NAK is associated with a packet that contains video data and determine which IP packet contains data that was lost in transmission; and
 only if the received NAK is associated with a packet that contains video data, the encoder is configured to perform error control.

36. An apparatus comprising:
 an encoder configured to encode a first frame of video data and audio data;
 a first module configured to form a packet with the encoded first frame of video data and to form a packet with the encoded audio data;
 a transceiver configured to (a) transmit the packets across a wireless channel to an access network and (b) receive a medium access control (MAC) layer negative acknowledgement (NAK) from the access network;
 before encoding a second frame of video data, a second module configured to determine whether the MAC layer received a NAK from the access network and determine whether the received NAK is associated with a packet that contains video data; and
 an error control module configured to perform error control only if the received NAK is associated with a packet that contains video data.

37. An apparatus comprising:
 means for encoding video data and audio data by an encoder device;
 means for forming an Internet protocol (IP) packet with the encoded video data and an IP packet with the encoded audio data using a module of the encoder device;
 means for transmitting the packets across a wireless channel to an access network using a transceiver of the encoder device;
 means for receiving a negative acknowledgement (NAK) from the access network at a medium access control (MAC) layer of the encoder device;
 means for determining, using the module of the encoder device, whether the received NAK is associated with a packet that contains video data;
 means for determining, using the module of the encoder device, which IP packet contains data that was lost in transmission; and
 means for performing error control by the encoder device only if the received NAK is associated with a packet that contains video data.

* * * * *